United States Patent [19]
Consadori et al.

[11] Patent Number: 5,348,224
[45] Date of Patent: Sep. 20, 1994

[54] GAS FLOW MODULATOR

[75] Inventors: Franco Consadori, Salt Lake City, Utah; Richard Slamka, Vancouver, Canada

[73] Assignee: Hydro Flame Corporation, Salt Lake City, Utah

[21] Appl. No.: 982,078

[22] Filed: Nov. 24, 1992

[51] Int. Cl.$^5$ .............................................. F16K 31/06
[52] U.S. Cl. .............................. 236/20 R; 251/129.08; 251/129.21
[58] Field of Search ....................... 251/129.21, 129.05, 251/129.08; 137/625.3; 236/20 R

[56] References Cited

U.S. PATENT DOCUMENTS

| | | | |
|---|---|---|---|
| 334,011 | 1/1886 | Franklin | 137/625.3 X |
| 3,187,775 | 6/1965 | Pinnell | 137/625.3 X |
| 3,349,798 | 10/1967 | Allen | 137/625.3 X |
| 4,411,289 | 10/1983 | Walters | 251/129.08 X |
| 4,548,047 | 10/1985 | Hayashi et al. | 236/75 X |
| 4,552,304 | 11/1985 | Papazian | 236/46 F |
| 4,681,143 | 7/1987 | Sato et al. | 251/129.21 X |
| 4,856,558 | 8/1989 | Kardos | 137/625.33 |
| 4,930,488 | 6/1990 | Pearman et al. | 126/39 |
| 4,960,377 | 10/1990 | Nunes et al. | 431/12 |
| 5,163,476 | 11/1992 | Wessman | 137/625.3 |

Primary Examiner—William E. Wayner
Attorney, Agent, or Firm—Workman, Nydegger and Jensen

[57] ABSTRACT

Gas is supplied to a gas flow modulator having a tubular member with a gas flow passage extending through the tubular member. A slide member in the gas flow passage is axially slidable longitudinally along the passage. Springs within the tubular member in opposite directions on the slide member so as to resiliently bias the slide member towards a predetermined position in the gas flow passage. A flow constrictor means is fixedly positioned within the gas flow passage for constricting gas flow along the gas flow passage, the slide member and the flow constrictor means being shaped to cease the flow of gas along the gas flow passage upon displacement of the slide member in a first direction from the predetermined position by means of an electromagnetic induction coil extending around the exterior of the tubular member and in cooperation with a magnetic material forming at least part of the slide member or secured thereto. The gas flow modulator may be used in a water heating system where a temperature sensing means senses water temperature to in turn control a power source to the induction coil so as to regulate the burning of gas at a gas burner in communication with the gas flow modulator. The slide member is prevented from sticking in the tubular member by rectifying or modulating the power signal to the induction coil which causes the slide member to vibrate.

7 Claims, 5 Drawing Sheets

GAS FLOW MODULATOR

BACKGROUND

1. Field of the Invention

The present invention relates to gas flow modulators and is useful particularly, but not exclusively, for regulating the gas supplies of heating appliances for domestic use and recreational vehicles.

2. Background Art

In the design and manufacture of gas appliances such as furnaces, water heaters, fireplaces and the like, it is often desirable to be able to regulate the flow of a gas to a burner in order to achieve certain desired operational parameters; for example, heat output, output air temperature and/or output water temperature.

In the past, flow control of gas to a burner has been limited to a status of either on or off and without an intermediate gas flow status. A problem with this type of system is that the object heated by the burner, typically a heat exchanger, experiences temperature extremes which in turn subject the same to thermal stresses so as to shorten its period of useful life. Additionally, this type of system fails to conserve energy in that heat loss occurs in the period of time when the gas is not flowing so as to allow the system to cool off rather than maintaining its proper temperature. The cooling off of the system may undershoot the desired low-end temperature, such undershooting representing an amount of heat loss which must then be offset by consumption of enough gas to re-heat the system to an acceptable temperature range. Also, the system may overshoot the desired high-end temperature during the period when the gas is flowing in order to raise the system to the desired temperature. Such undershooting and overshooting represent heat loss which must then be offset to adjust the system to an acceptable temperature range. Further, the range of environmental comfort is not enhanced but is rather deterred by a greater than desired temperature range occurring from over and under shootings.

Also in the past, regulation of the flow of a gas to a burner has sometimes been accomplished by mechanically closed loop systems, employing a sealed capillary tube containing a heat-expandable fluid which is used to sense the temperature at a predetermined location and to generate a control pressure, which in turn is used to cause a change of gas flow in a specially designed valve.

In the case of demand water heaters, a similar approach of mechanically adjustable valves has been used by sensing the pressure of input water by means of a diaphragm or other pressure-responsive device and generating a control pressure in a fluid which, in turn, is applied to a valve designed to adjust a gas flow to a desired value.

A problem with mechanically adjustable valves is the lack of the automatic adjustability known to electrically controlled systems. The development of electronic sensors and controllers for regulating gas flow to a burner requires a gas flow control function to be effected by the use of electrical signals, rather than mechanical, i.e. pneumatic, signals. Such electrically controlled gas flow valves must also be safeguarded from the potentially dangerous condition of the valve sticking and failing to adjust, which may cause heat loss, excess heat, or system failure in general.

BRIEF SUMMARY AND OBJECTS OF THE INVENTION

It is therefore an object of the invention to provide a flow control of gas to a burner that may be adjustable to an intermediate status between on or off.

It is a further object of the present invention to reduce temperature extremes experienced by containers heated by flow controlled combustible gas so as to reduce thermal stresses and increase the useful life of the same.

Another important objective of the present invention is to conserve energy from heat loss occurring when the flow controlled combustible gas is shut off, and to also avoid system temperature undershooting and overshooting.

An additional objective of the present invention is to enhance the environmental comfort by reducing temperature extremes in flow controlled combustible gas systems.

A further objective of the present invention is to provide a flow controlled combustible gas system that appropriates the automatic adjustability known to electrically controlled valve systems, while safeguarding against the condition of valves failing to adjust.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, there is provided a regulated combustible gas source supplying a flow of gas to a burner which heats a vessel. The gas flow is modulated between the source and burner by a modulator which has a tubular member, for example a length of pipe of standard diameter, defining a gas flow passage extending through the tubular member. A slide member or poppet is disposed in the gas flow passage and is slidable axially in both directions along the passage. Spring means, for example, one or more helical compression springs located within the tubular member and acting in opposite directions on the slide member, resiliently bias the slide member toward a predetermined position in the gas passage.

A flow constrictor means is fixedly positioned within the gas flow passage for constricting gas flow along the gas flow passage, the slide member and the flow constrictor means being shaped to decrease the flow of gas along the gas flow passage upon displacement of the slide member in a first direction from the predetermined position.

For effecting this displacement of the slide member from the exterior of the tubular member, there is provided an electromagnetic means in the form of, for example, an induction coil extending around the exterior of the tubular member and co-operating with a magnetic means forming at least part of the slide member or secured thereto.

Another preferred embodiment features a temperature probe that is provided within the vessel for sensing temperature within the vessel, the probe producing a signal which is sent to a controller which in turn controls electrical power applied to the induction coil so as to modulate the flow of combustible gas to the burner according to a pre-set temperature range stored in the controller.

Another embodiment of the present invention features dual springs having relative spring constant values so that when the power source to the induction coil is shut down or disconnected, the slide member or poppet is forced to a position which in turn stops all flow of gas through the modulator. Such an embodiment requires that one of the springs have a greater spring constant with concomitantly different force upon the slide member or poppet than the opposing spring. An equivalent of this embodiment is a single internally placed spring, rather that two internally placed springs, the one spring forcing the slide member to a position in the tube which shuts off the gas when no electric power is flowing to the induction coil, the force of the single spring being overcome to allow gas to flow past the slide member only when the electrical power is both on and being applied to the induction coil.

A further preferred embodiment of the present invention features a rectifier means in electrical communication between the electrical power source and the induction coil so that the signal to induction coil is rectified. Such a signal causes the induction coil to effect the magnetic means associated with the slide member so that the slide member vibrates within the tube. The vibration safeguards against the condition of the slide member sticking within the tube and failing to adjust the gas flow.

Alternatively and in place of the rectifier, a digital controller can be used as a modulator to modulate to a desired frequency the electrical power source signal sent to the induction coil so as to achieve the same effect.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

Figure 6:
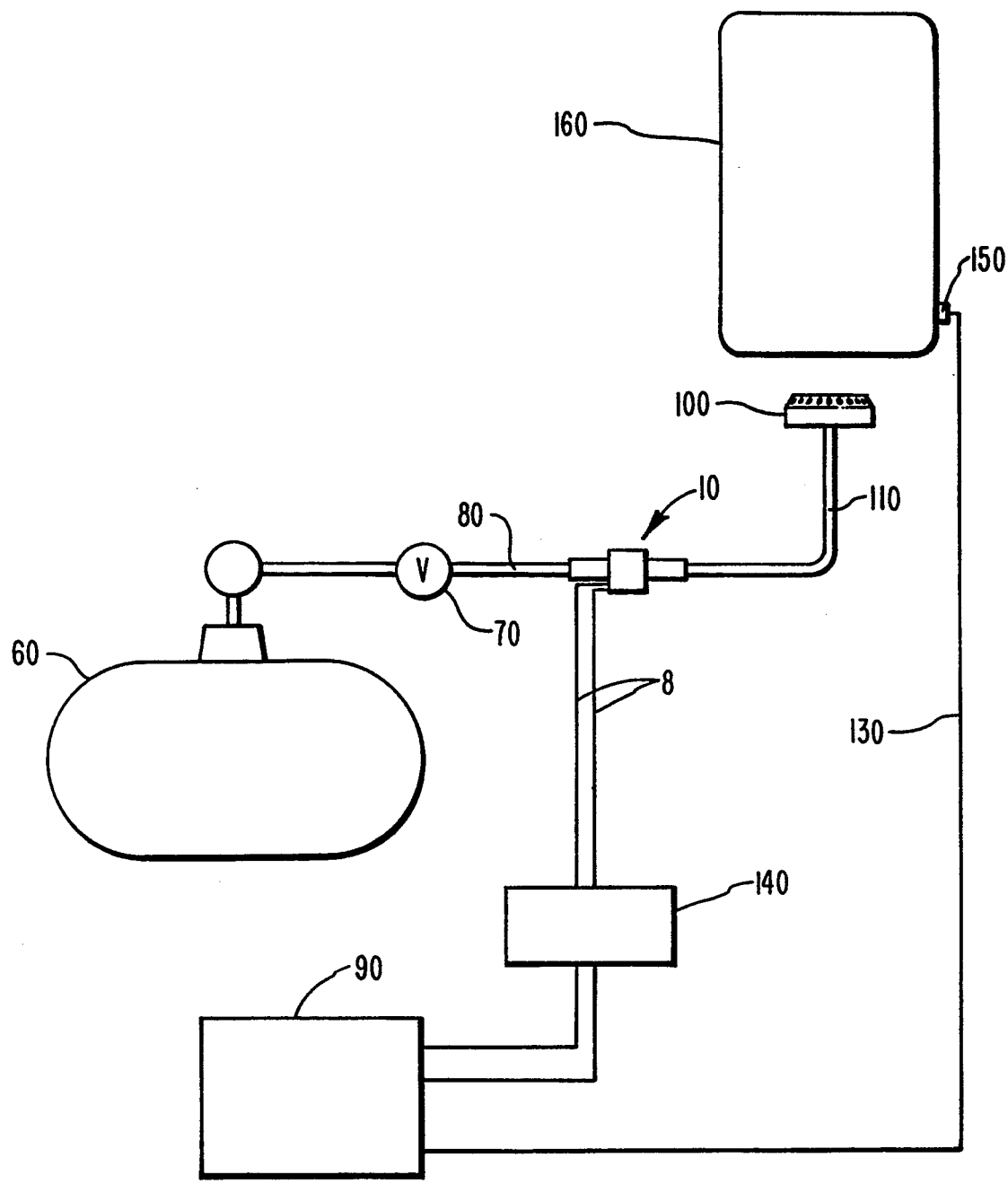
FIG. 6 shows a system flow diagram of a preferred embodiment of a controlled gas flow heating system having a gas flow modulator.

An overview of the controlled gas flow heating system of the present invention is shown in FIG. 6 where a gas source 60 is supplying a gas flow through a demand regulator 70 through gas line 80 to a gas flow modulator indicated generally by reference numeral 10. The gas flow modulator 10 is electrically powered via leads 8 from power source/controller 90. Gas flowing from the gas flow 10 flows to burner 100 where combustion is initiated to heat exchanger 160. In some applications of the present invention, both burner 100 and heat exchanger 160 may be within a common containing means.

Figure 1:
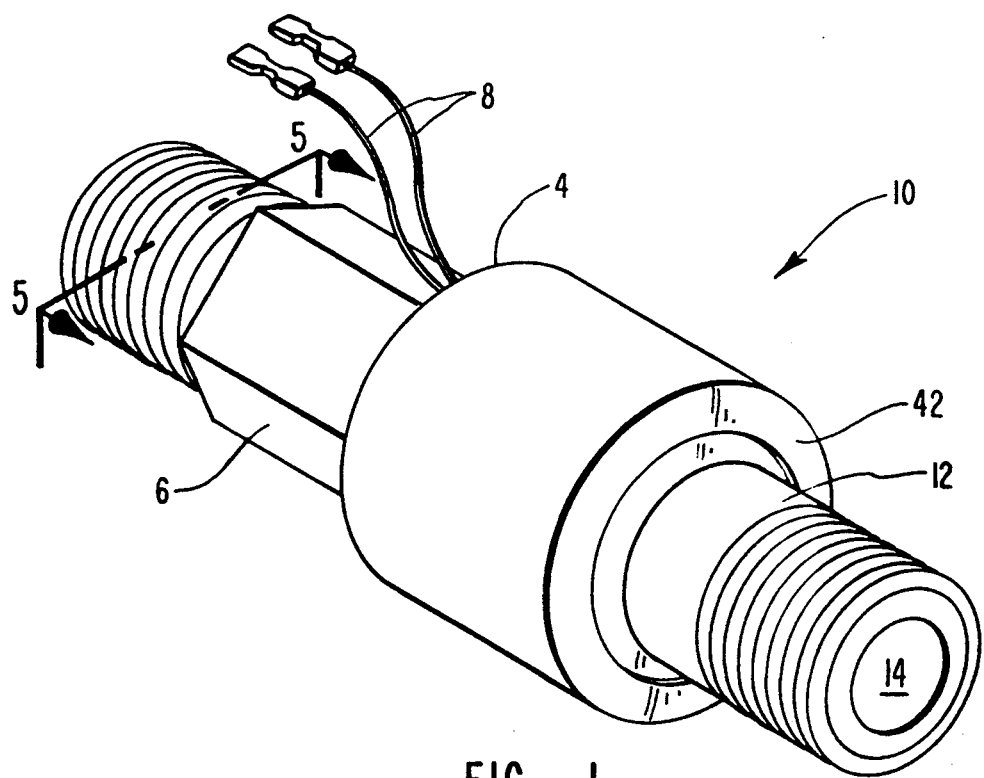
FIG. 1 shows a perspective view of the gas flow modulator according to one embodiment of the present invention.

As shown in FIG. 1 of the accompanying drawings, a gas flow modulator indicated generally by reference numeral 10 has a cylindrical housing formed by a tubular member 12 in the form of a length of pipe of standard size.

More particularly, the tubular member 12 is of a diameter and thickness compatible with the size of gas ducting (not shown) for which the gas flow modulator 10 is intended, and may be provided at opposite ends with male or female threads or fittings (not shown) of the type and size suitable for connection to the above-mentioned gas ducting. The outer surface of the tubular member 12 may also be provided with a hexagonal nut means 6 or the like to enable the gas flow modulator 10 to be installed and adjusted with a hand tool such as a wrench.

The material selected for the tubular member 12 is non-magnetic and compatible for use with the gas ducting. In the present embodiment of the invention, the tubular member 12 is made of stainless steel, but brass, plastic material or other suitable material may alternatively be used.

Figure 2:
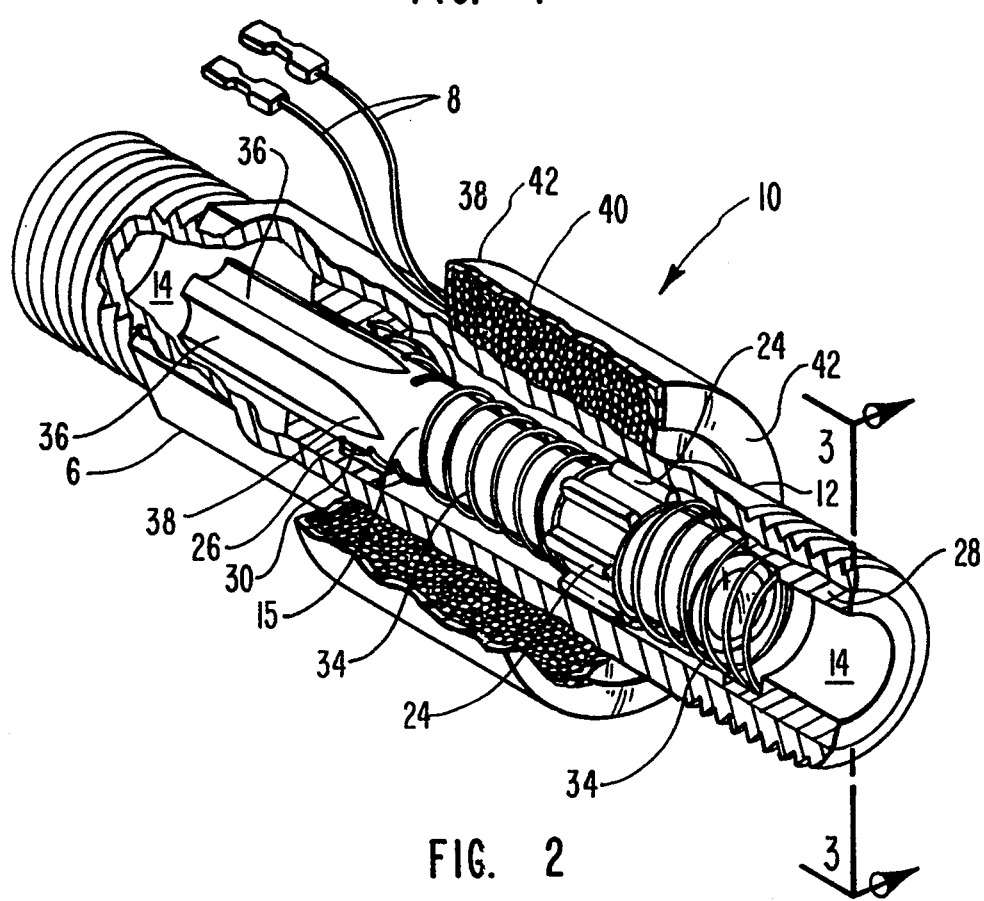
FIG. 2 shows a perspective view of the gas flow modulator according to one embodiment of the present invention, cut away to show the internal structure of the gas flow modulator.
Figure 3:
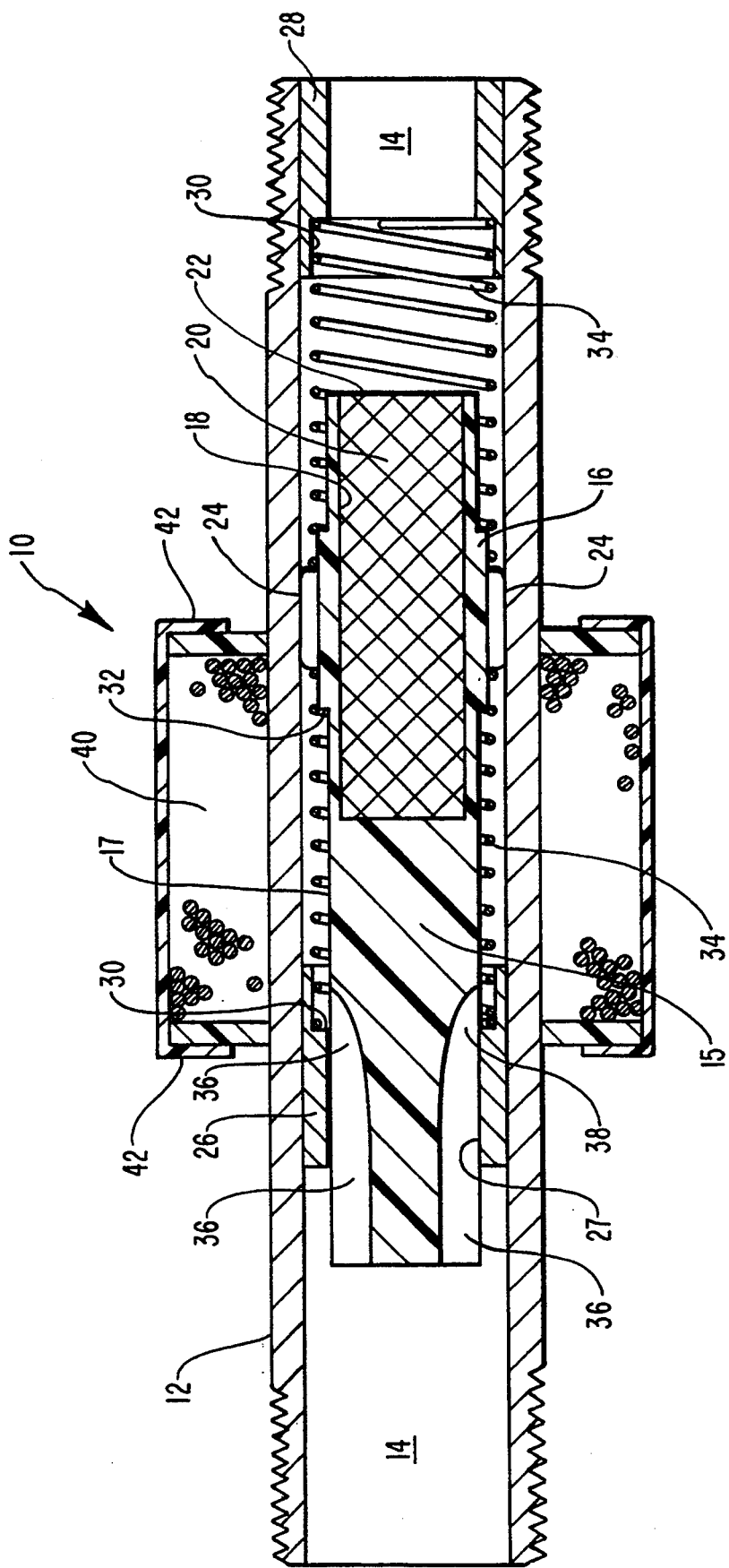
FIG. 3 shows a transverse cross-section view, taken along the line 3—3 of FIG. 2 with the gas flow passage open.
Figure 4:
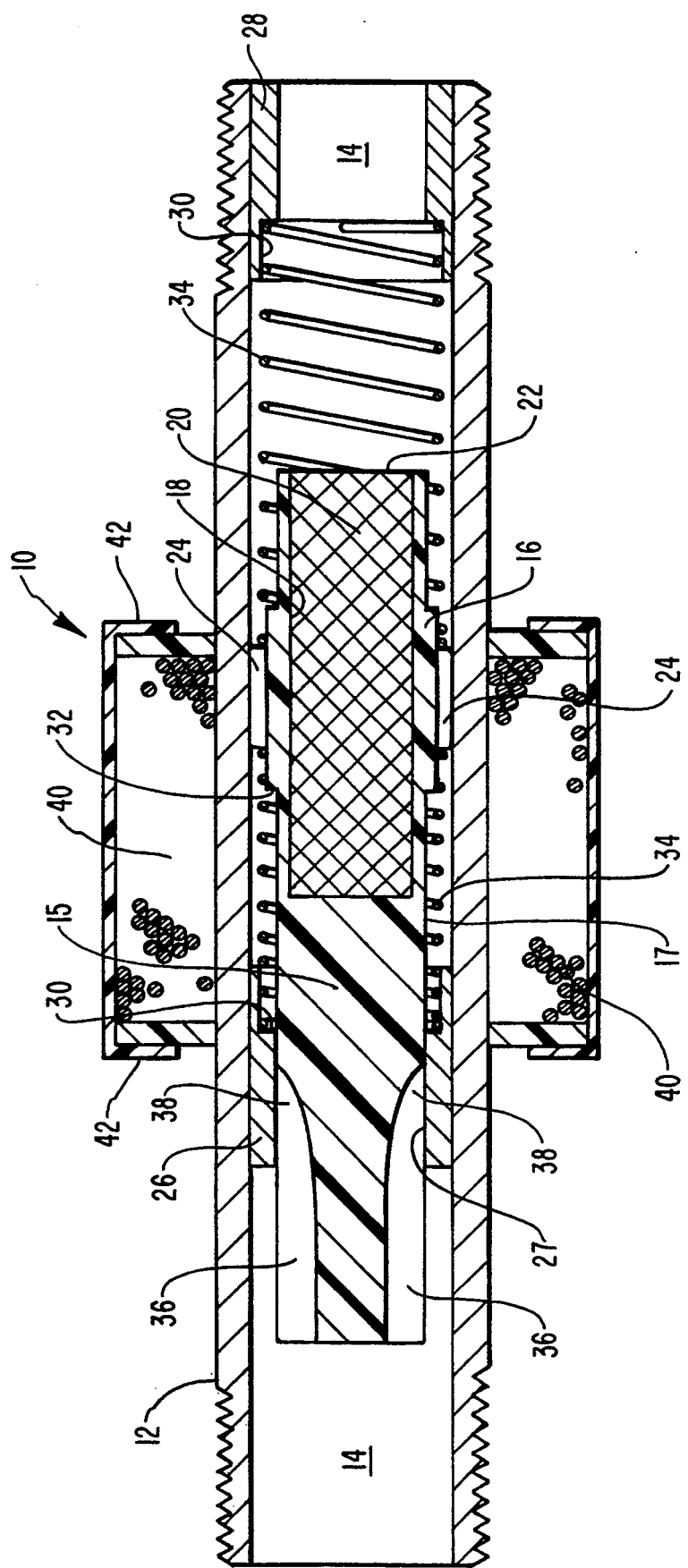
FIG. 4 shows a transverse cross-section view as in FIG. 3 with the gas flow passage closed.
Figure 5:
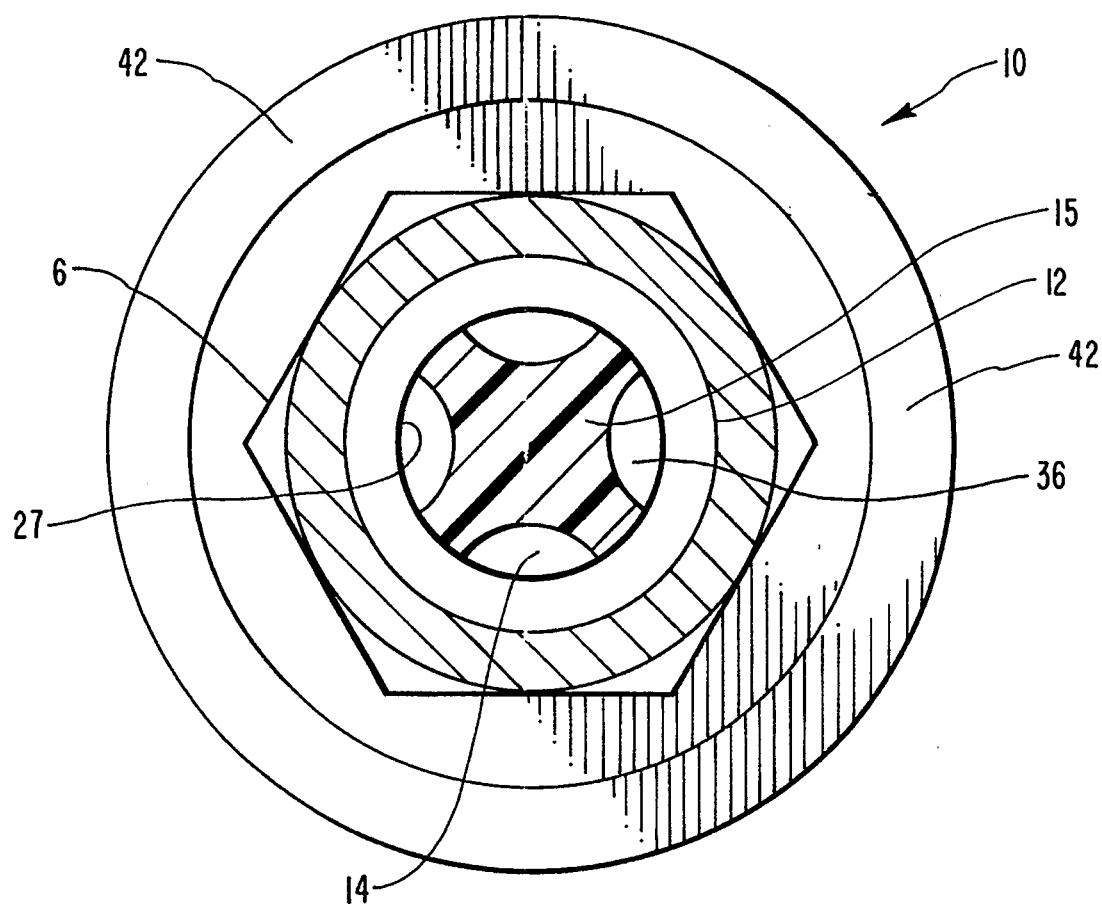
FIG. 5 shows a view in axial end elevation view taken along the 1—1 line of FIG. 1.

In FIGS. 2 through 4, the interior of the tubular member 12 forms a gas flow passage 14 which contains a slide member 15 of plastic material. The material of the slide member 15, which may be other than plastic material, and thus for example may be metal, is selected so as to be suitable for use in the type of gas intended to be regulated by the gas flow modulator 10.

The slide member 15 is of generally cylindrical shape, with an enlarged portion 16 formed near one end of the slide member 15 on the cylindrical surface 17 of the slide member 15. At the same end of the slide member 15, there is formed a cylindrical recess 18, into which is press-fitted a cylindrical magnet 20, which has an end portion 22 that is even with this end of the slide member 15. Instead of being press-fitted in the recess 18, the magnet 20 may alternatively be glued or otherwise securely mounted in this recess.

The enlarged portion 16 is of generally cylindrical shape, with an outer peripheral cylindrical surface in sliding contact with the internal surface of the slide member 15 for guiding the slide member 15 axially in either direction along the gas flow passage 14.

The peripheral surface of the enlarged portion 16 is, however, interrupted by eight slots 24, which extend parallel to the axis of the tubular member 12 and the slide member 15 and which are equiangularly spaced about the peripheral surface of the enlarged portion 16. The slots 24 allow gas to flow along the gas flow passage 14 past the enlarged portion 16.

At opposite sides of the enlarged portion 16, and axially spaced therefrom a pair of bushings 26 and 28 are press-fitted into the tubular member 12. The bushings 26 and 28 are each formed with an internal step 30 and the enlarged portion 16 is formed, at opposite sides thereof, with a corresponding pair of external steps 32 which are at least approximately complementary to the steps 30.

A pair of helical compression springs 34 extend around the slide member 15 and within the steps 30 and around the steps 32, the springs 34 being seated on the bushings 26 and 28 and the enlarged portion 16.

The springs 34 resiliently bias the slide member 15 axially within the tubular member 12 into a predetermined position, in which the slide member 15 is shown in FIG. 1, while allowing the slide member 15 to be displaced axially of the tubular member 12 from this predetermined position, as explained below.

At its end opposite from the magnet 20, the cylindrical surface 17 of the slide member 15 is formed with four slots 36, which extend from this end of the slide member 15 along approximately one-quarter of the length of the slide member 15. The slots 36, in cooperation with the bushing 26, determine the gas flow along the gas flow passage 14, as described in greater detail below, and thus the length, cross-sectional size and number of the slot 36 determine the performance parameters of the gas modulator 10.

Beyond the slots 36, four additional slots 38, which are likewise formed in the cylindrical surface 17 but which are substantially shallower than the slots 36, extend along the cylindrical surface 17 for a short distance, in alignment with the slots 36.

At the exterior of the tubular member 12, an induction coil 40 extends around the tubular member 12 between a pair of annular baffles 42. The induction coil 40 cooperates with the magnet 20 to effect the displacement of the slide member 15 along the gas flow passage 14.

In use, the gas flow modulator 10 is connected between a demand gas regulator and the orifice of a burner. At this location, the gas flow modulator 10 receives gas at a pressure established by the demand regulator and, by applying a suitable current to the induction coil 40, the slide member 15 can be displaced axially so as to provide a variable obstruction to the flow of the gas, thus reducing the demand regulator output and the driving pressure of the burner orifice with consequential reduction of the heat output of the burner.

More particularly, the flow of gas is controlled by the position of the slide member 15 relative to the bushing and, thus, by the degree of opening available between the slide member 15 and the bushing 26 through which the gas can pass.

When the slide member 15 is displaced to the left, as viewed in FIG. 1, from its normal predetermined or rest position, in which it is shown in FIG. 1, to such an extent that the axial portion of the cylindrical surface 17 uninterrupted by the slots 36 and 38 has been moved into the bushing 26 past the shoulder 30 thereof, then only a small amount of gas can flow through a small clearance which exists between the cylindrical surface 17 and inner cylindrical surface 27 of the bushing 26.

In the position of the slide member 15 shown in FIG. 1, a greater amount of the gas can flow through the slots 38.

When the slide member 15 is displaced so that the slots 36 extend to the right, as viewed in FIG. 1, past the shoulder 30 of the bushing 26, then a still greater amount of gas can flow past the bushing 26.

The amount of the gas which thus flows through the slots 38 and 36 depends not only on the cross-sectional area of these slots but also, to at least some extent, on the length of the slots which extends past the shoulder 30 of the bushing 26, so that the gas flow is not varied in an abrupt step-wise manner during the above-described displacement of the slide member.

If desired, the cross-sectional areas of the slots 36 and 38 can be varied along the length thereof in order to produce a corresponding variation of the rate of gas flow during the above-described displacement of the slide member 15. The size of the openings through which the gas can flow between the bushing 26 and the slide member 15 is determined by the dimensions of the slots 38 and the axial position in tube 12 of the slide member 15 relative to the bushing 26. By proper shaping of the size of the slots 38, a minimum flow can always be assured by allowing gas to escape even in the position of greatest flow obstruction.

A modulating action of the slide member 15 is produced by applying an appropriate current, via leads 8 from power source 90, to the induction coil 40, which results in a movement of the slide member 15, which in turn allows more or less gas to pass by the bushing 26 and through the slots 36, 38 of the slide member 15.

The magnitude of the current supplied via leads 8 from power source/controller 90 to the induction coil 40 may be controlled by a temperature sensing means 150 which senses the effect of the output of the burner 100 upon a heat exchanger 160. The temperature sensing means 150 creates a signal which is sent via connector 130 to power source/controller 90. The controller component of the power source/controller 90 analyzes the signal, by any method and means such as digital or analog, and in turn appropriately controls power output to the induction coil 40 according to a pre-set controller routine, such controllers and routines for the same being well known to those of skill in the art. Thus, for example, in the case of a water heater, the temperature of the water heated, for example in heat exchanger 160, by the heater, for example burner 100, can be sensed, for example by temperature sensing means 150, to provide a signal, for example via connector 130, to power source/controller 90 which in turn controls the energizing of the induction coil 40.

The power source/controller 90 may be furnishing D.C. or A.C. power to the induction coil 40. An advantage may be gained by installing a rectifier means 140 in electrical communication with power source/controller 90 so as to supply the induction coil 40 with a rectified signal. Such a signal causes the induction coil 40 to effect the magnetic means 20 associated with a poppet or slide member 15 so that the slide member 15 vibrates within the tube 12. The vibration, in conjunction with internal and opposing springs 34, safeguard against the condition of the slide member 15 sticking within the tube 12 and failing to adjust the gas flow. By way of example and not by way of limitation, a rectified signal in the range around 60 Hz could be so applied. Alternatively and in place of the rectifier, a digital controller can be used to modulate the electrical power source signal to the induction coil to a desired frequency so as to achieve the same effect.

As will be apparent to those skilled in the art, various modifications of the present invention may be made within the scope of the invention as defined in the appended claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A controlled flow gas heating system comprising:
    a source of combustible gas;
    a gas flow modulator receiving a flow of gas from said source of combustible gas and comprising:
        a tubular member having an interior surface defining a gas flow passage extending through the tubular member;
        a slide member disposed in the gas flow passage and having an exterior surface with a plurality of ridges projecting therefrom, said plurality of ridges being axially slidable along the interior surface of the gas flow passage and separating the exterior surface of the slide member from contact with the interior surface of the tubular member;
        means for biasing said slide member towards a predetermined position in the gas flow passage and comprising a pair of compression springs within said tubular member seated on opposite sides of said plurality of ridges, said compression springs acting in opposite directions on said slide member;
        flow constrictor means, fixedly positioned within and extending from the interior surface of the gas flow passage, for constricting gas flow along the gas flow passage and comprising one of a pair of annular inserts in said tubular member, said exterior surface of said slide member having slots formed therein and extending slidably through said one of said pair of annular inserts to control gas flow along said gas flow passage in dependence on the position of said slots relative to said one of said pair of annular inserts, said compression springs being seated on respective ones of said pair of annular inserts;
        said slide member and said flow constrictor means being shaped to adjust the flow of gas along the gas flow passage upon displacement of said slide member in a first direction from the predetermined position; and
        electromagnetic means for effecting the displacement of said slide member from the exterior of the tubular member;
    a power source in electrical communication with and for providing power to said electromagnetic means;
    a burner orifice receiving an output of said combustible gas from said gas flow passage.

2. The controlled flow gas heating system as defined in claim 1, further comprising:
    a controller in electrical communication with said power source; and
    a containing means having a medium therein, both said containing means and said medium being heated by combustion of said combustible gas at said burner orifice, said medium having therein a temperature sensing means in communication with said power source for sensing the temperature of said medium and for outputting a signal to said controller by which said controller controls the power output by said power source to said electromagnetic means,
    whereby the flow of combustible gas through said gas flow modulator to said burner is a function of the temperature at said medium.

3. The controlled flow gas heating system as defined in claim 1, wherein said slide member and said flow constrictor means are shaped to decrease the flow of said gas along the gas flow passage upon displacement of said slide member in said first direction from the predetermined position.

4. The controlled flow gas heating system as defined in claim 1, wherein said slide member and said flow constrictor means are shaped such that said predetermined position of said slide member within said gas flow passage substantially decreases the flow of gas along the gas flow passage, and such that upon displacement of said slide member in said first direction from the predetermined position the flow of gas is increased along the gas flow passage.

5. The controlled flow gas heating system as defined in claim 1, wherein said electromagnetic means comprises an induction coil extending around said tubular member and co-operating with magnetic material forming at least part of said slide member.

6. The controlled flow gas heating system as defined in claim 1, further comprising:
    a rectifier means for rectifying an electrical power signal sent from said power source to said electromagnetic means, said rectifier means being in electrical communication between said electrical power source and the electromagnetic means, whereby the slide member vibrates within the gas flow passage.

7. The controlled flow gas heating system as defined in claim 1, further comprising:
    a digital controller means for digitally modulating to a desired frequency an electrical power signal that sent from said power source to said electromagnetic means, said digital controller means being in electrical communication between said electrical power source and the electromagnetic means, whereby the slide member vibrates within the gas flow passage.

* * * * *